United States Patent
Duluk, Jr. et al.

(10) Patent No.: US 12,379,959 B2
(45) Date of Patent: Aug. 5, 2025

(54) COMPUTE TASK STATE ENCAPSULATION

(71) Applicant: NVIDIA CORPORATION, Santa Clara, CA (US)

(72) Inventors: Jerome F. Duluk, Jr., Palo Alto, CA (US); Lacky V. Shah, Los Altos Hills, CA (US); Sean J. Treichler, Piedmont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 400 days.

(21) Appl. No.: 17/063,705

(22) Filed: Oct. 5, 2020

(65) Prior Publication Data

US 2021/0019185 A1    Jan. 21, 2021

Related U.S. Application Data (63) Continuation of application No. 13/292,951, filed on Nov. 9, 2011, now Pat. No. 10,795,722.

(51) Int. Cl.
    *G06F 9/48*    (2006.01)
    *G06F 9/46*    (2006.01)
    *G06F 9/50*    (2006.01)

(52) U.S. Cl.
    CPC ............ *G06F 9/4881* (2013.01); *G06F 9/463* (2013.01); *G06F 9/5005* (2013.01); *G06F 9/5038* (2013.01); *G06F 2209/483* (2013.01); *G06F 2209/486* (2013.01)

(58) Field of Classification Search
    None
    See application file for complete search history.

(56) References Cited

U.S. PATENT DOCUMENTS

| | | | |
|---|---|---|---|
| 6,839,889 B2 | 1/2005 | Liu | |
| 7,051,329 B1 * | 5/2006 | Boggs | G06F 9/5061 |
| | | | 712/E9.035 |
| 7,310,649 B1 * | 12/2007 | Ginsberg | G06F 5/10 |
| 7,533,236 B1 * | 5/2009 | Nordquist | G06F 9/5016 |
| | | | 711/170 |

(Continued)

FOREIGN PATENT DOCUMENTS

| | | |
|---|---|---|
| CN | 1687897 A | 10/2005 |
| CN | 101630271 A | 1/2010 |
| TW | 200900926 A | 1/2009 |

OTHER PUBLICATIONS

Aho et al., "Data Structures and Algorithms", Addison-Wesley Publishing Company, 1982, pp. 42-60.

(Continued)

*Primary Examiner* — Bradley A Teets
*Assistant Examiner* — Melissa A Headly
(74) *Attorney, Agent, or Firm* — Artegis Law Group, LLP (57) ABSTRACT

One embodiment of the present invention sets forth a technique for encapsulating compute task state that enables out-of-order scheduling and execution of the compute tasks. The scheduling circuitry organizes the compute tasks into groups based on priority levels. The compute tasks may then be selected for execution using different scheduling schemes. Each group is maintained as a linked list of pointers to compute tasks that are encoded as task metadata (TMD) stored in memory. A TMD encapsulates the state and parameters needed to initialize, schedule, and execute a compute task.

22 Claims, 8 Drawing Sheets

(56) References Cited

U.S. PATENT DOCUMENTS

| | | | | |
|---|---|---|---|---|
| 7,697,007 | B1 * | 4/2010 | Duluk, Jr. | G06T 1/20 |
| | | | | 718/107 |
| 7,765,549 | B1 * | 7/2010 | Lauer | G06F 9/5005 |
| | | | | 709/201 |
| 8,336,056 | B1 | 12/2012 | Gadir | |
| 8,675,006 | B2 * | 3/2014 | Ford | G06T 1/20 |
| | | | | 345/506 |
| 2007/0074207 | A1 | 3/2007 | Bates et al. | |
| 2009/0089785 | A1 | 4/2009 | Marwinski et al. | |
| 2009/0307708 | A1 | 12/2009 | Archer et al. | |
| 2010/0293353 | A1 | 11/2010 | Sonnier et al. | |
| 2010/0318995 | A1 * | 12/2010 | Messmer | G06F 9/4881 |
| | | | | 718/102 |
| 2011/0035757 | A1 | 2/2011 | Comer | |
| 2011/0067034 | A1 | 3/2011 | Kawamoto | |
| 2011/0161969 | A1 | 6/2011 | Arndt et al. | |
| 2011/0167425 | A1 | 7/2011 | Lurie et al. | |
| 2012/0260062 | A1 * | 10/2012 | Derby | G06F 9/30109 |
| | | | | 712/4 |
| 2013/0219397 | A1 | 8/2013 | Adams et al. | |

OTHER PUBLICATIONS

Aho et al., "Data Structures and Algorithms", Addison-Wesley, 1999, 57 pages.

Kato et al., "TimeGraph: GPU Scheduling for Real-Time Multi-Tasking Environments", Proceedings of the 2011 USENIX Annual Technical Conference, URL: https://www.usenix.org/legacy/events/atc11/tech/, Jun. 15-17, 2011, 16 pages.

* cited by examiner

Figure 7

COMPUTE TASK STATE ENCAPSULATION

CROSS-REFERENCE TO RELATED APPLICATION

This application is a continuation of co-pending U.S. patent application titled, "COMPUTE TASK STATE ENCAPSULATION", filed on Nov. 9, 2011 and having application Ser. No. 13/292,951. The subject matter of this related application is hereby incorporated by reference.

BACKGROUND OF THE INVENTION

Field of the Invention

The present invention generally relates to execution of compute tasks and more specifically to the encapsulation of compute task state.

Description of the Related Art

Conventional execution of compute tasks in multiple processor systems receives processing tasks from a stream of commands that encode state information for configuring the multiple processors interleaved with data to be processed. The data is processed in the order that the data appears in the stream. When the processing of data later in the stream is not dependent on the completion of processing data earlier in the stream, the data may be processed out of order compared with the order that the data appears in the stream. A benefit is that non-dependent processing tasks may be executed concurrently when adequate processing resources are available for multiple processing tasks.

Accordingly, what is needed in the art is a system and method for encapsulating compute task state to enable out-or-order scheduling and execution of the compute tasks.

SUMMARY OF THE INVENTION

A system and method for encapsulating compute task state enables out-or-order scheduling and execution of the compute tasks. The scheduling circuitry organizes the compute tasks into groups based on priority levels. The compute tasks may then be selected for execution using different scheduling schemes. Each group is maintained as a linked list of pointers to compute tasks that are encoded as task metadata (TMD) stored in memory. A TMD encapsulates the state and parameters needed to initialize and execute a compute task.

Various embodiments of a method of the invention for encapsulating compute tasks include allocating memory for storing a task metadata structure. The method also includes storing initialization parameters in the task metadata structure that configure a streaming multiprocessor to execute a compute task, storing scheduling parameters in the task metadata structure that control the scheduling of the compute task, storing execution parameters in the task metadata structure that control execution of the compute task by the streaming multiprocessor, and executing the compute task.

Various embodiments of the invention include a system for encapsulating compute tasks include a memory that is configured to store a task metadata structure corresponding to the compute tasks and a multi-threaded processor. The multi-threaded processor is configured to allocate a portion of the memory for storing the task metadata structure, store initialization parameters in the task metadata structure that configure the streaming multiprocessor to execute a compute task, store scheduling parameters in the task metadata structure that control the scheduling of the compute task, and store execution parameters in the task metadata structure that control execution of the compute task by the multi-threaded processor. The multi-threaded processor that is also configured to execute the compute task.

The encapsulation of compute tasks into TMDs enables scheduling of the compute tasks for out-of-order execution. Additionally, the compute tasks may be executed concurrently and parameters that control the execution of the compute tasks may be encoded in the TMD. Initialization and execution scheduling parameters are used to configure streaming multiprocessors and memory resources for execution of each TMD.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
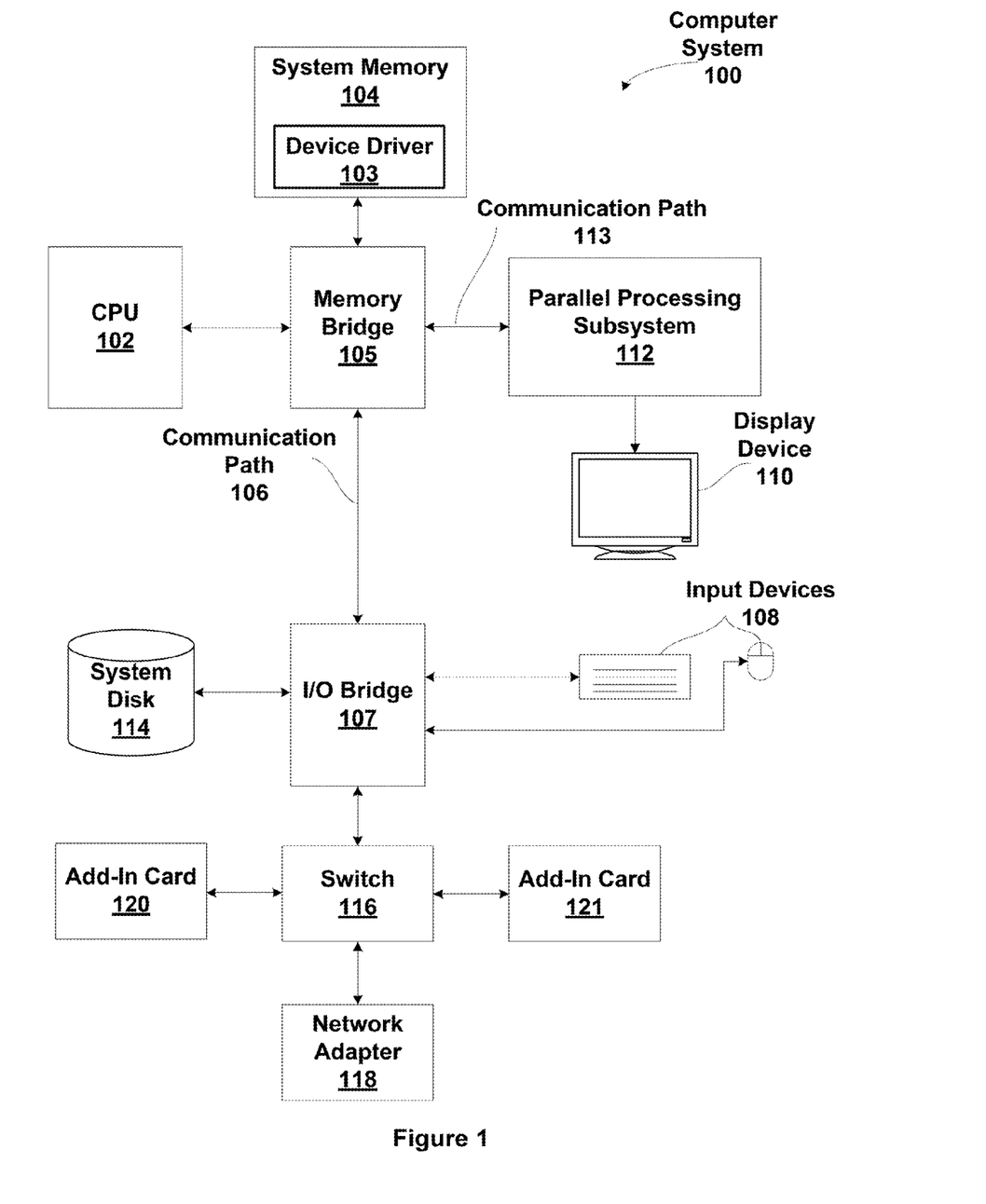
FIG. 1 is a block diagram illustrating a computer system configured to implement one or more aspects of the invention.

FIG. 1 is a block diagram illustrating a computer system 100 configured to implement one or more aspects of the present invention. Computer system 100 includes a central processing unit (CPU) 102 and a system memory 104 communicating via an interconnection path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI-Express, AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. Large embodiments may include two or more CPUs 102 and two or more parallel processing systems 112. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
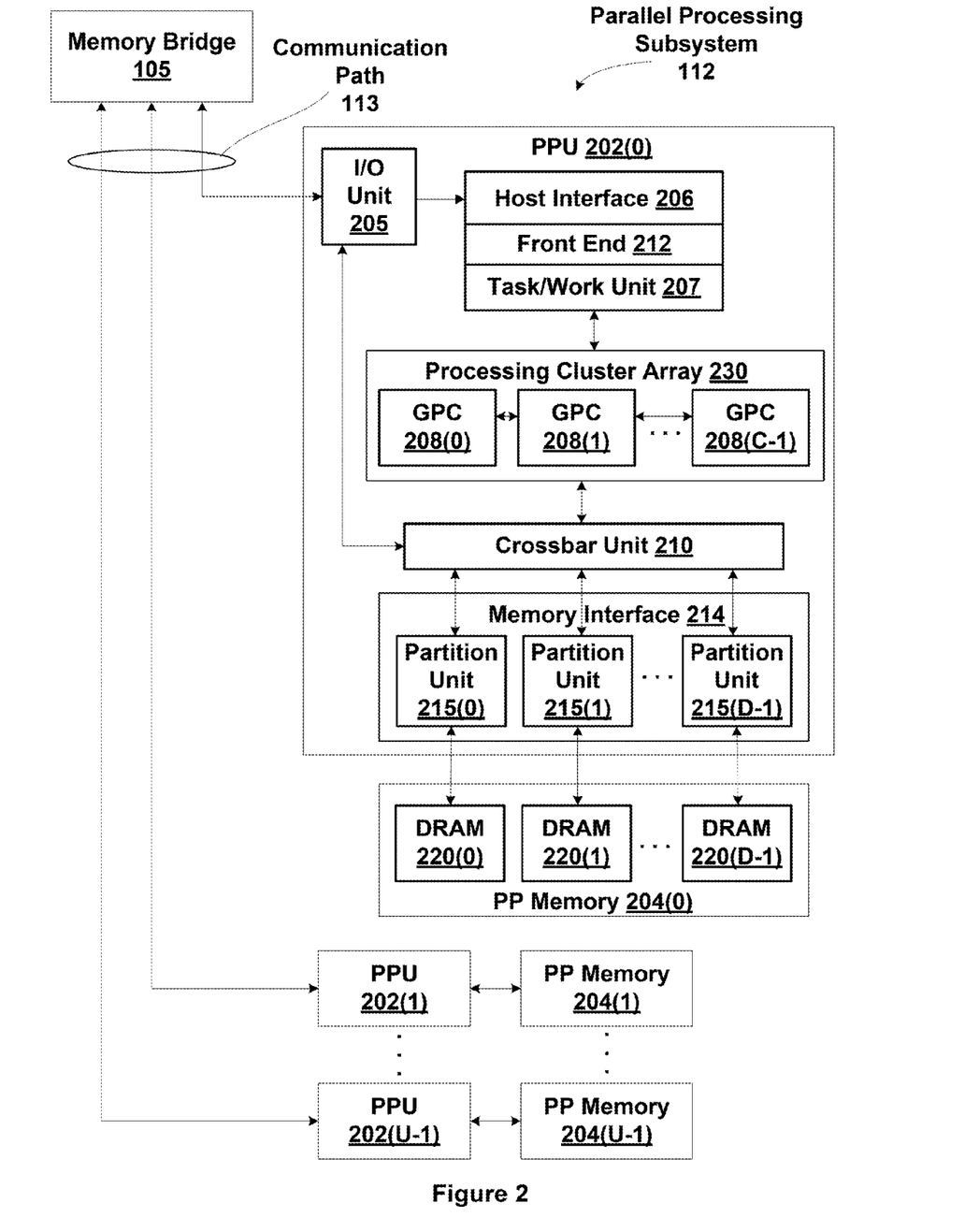
FIG. 2 is a block diagram of a parallel processing subsystem for the computer system of FIG. 1, according to one embodiment of the invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U z 1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various operations related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a data structure (not explicitly shown in either FIG. 1 or FIG. 2) that may be located in system memory 104, parallel processing memory 204, or another storage location accessible to both CPU 102 and PPU 202. A pointer to each data structure is written to a pushbuffer to initiate processing of the stream of commands in the data structure. The PPU 202 reads command streams from one or more pushbuffers and then executes commands asynchronously relative to the operation of CPU 102. Execution priorities may be specified for each pushbuffer to control scheduling of the different pushbuffers.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-EXPRESS link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the command stream stored in the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C z 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary dependent on the workload arising for each type of program or computation.

GPCs 208 receive processing tasks to be executed from a work distribution unit within a task/work unit 207. The work distribution unit receives pointers to compute processing tasks (task pointers) that are encoded as task metadata (TMD) and stored in memory. The task pointers to TMDs are included in the command stream that is stored as a pushbuffer and received by the front end unit 212 from the host interface 206. Processing tasks that may be encoded as TMDs include indices of data to be processed, as well as state parameters and commands defining how the data is to be processed (e.g., what program is to be executed). The task/work unit 207 receives tasks from the front end 212 and ensures that GPCs 208 are configured to a valid state before the processing specified by each one of the TMDs is initiated. A priority may be specified for each TMD that is used to schedule execution of the processing task.

Memory interface 214 includes a number D of partition units 215 that are each directly coupled to a portion of parallel processing memory 204, where D z 1. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the DRAMs 220 within parallel processing memory 204. Crossbar unit 210 is configured to route the output of each GPC 208 to the input of any partition unit 215 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. In the embodiment shown in FIG. 2, crossbar unit 210 is directly connected with I/O unit 205. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-EXPRESS) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Multiple Concurrent Task Scheduling

Multiple processing tasks may be executed concurrently on the GPCs 208 and a processing task may generate one or more "child" processing tasks during execution. The task/work unit 207 receives the tasks and dynamically schedules the processing tasks and child processing tasks for execution by the GPCs 208.

Figure 3:
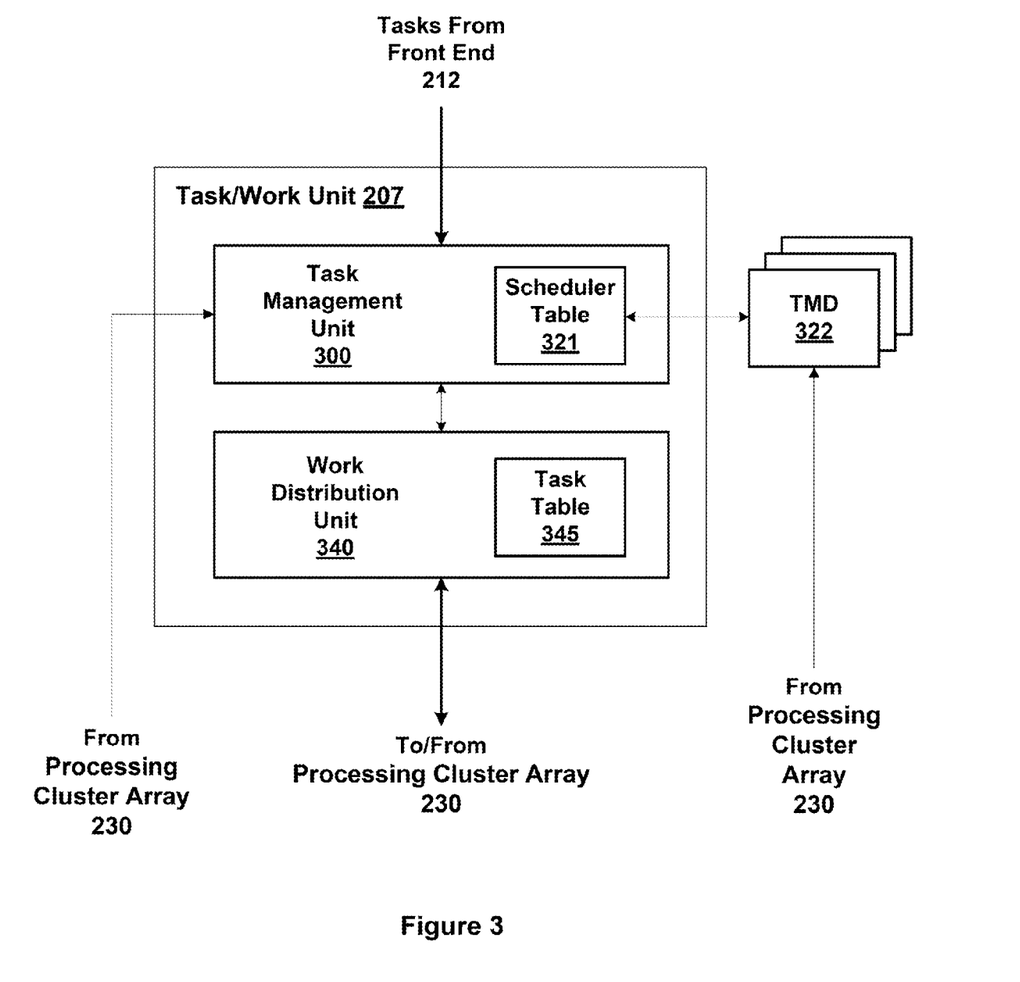
FIG. 3 is a block diagram of the Task/Work Unit of FIG. 2, according to one embodiment of the invention.

FIG. 3 is a block diagram of the task/work unit 207 of FIG. 2, according to one embodiment of the present invention. The task/work unit 207 includes a task management unit 300 and the work distribution unit 340. The task management unit 300 organizes tasks to be scheduled based on execution priority levels. For each priority level, the task management unit 300 stores a list of task pointers to the TMDs 322 corresponding to the tasks in the scheduler table 321, where the list can be implemented with a linked list. The TMDs 322 may be stored in the PP memory 204 or system memory 104. The rate at which the task management unit 300 accepts tasks and stores the tasks in the scheduler table 321 is decoupled from the rate at which the task management unit 300 schedules tasks for execution, enabling the task management unit 300 to schedule tasks based on priority information or using other techniques.

The work distribution unit 340 includes a task table 345 with slots that may each be occupied by the TMD 322 for a task that is being executed. The task management unit 300 may schedule tasks for execution when there is a free slot in the task table 345. When there is not a free slot, a higher priority task that does not occupy a slot may evict a lower priority task that does occupy a slot. When a task is evicted, the task is stopped, and if execution the task is not complete, the task is added to a linked list in the scheduler table 321. When a child processing task is generated, the child task is added to a linked list in the scheduler table 321. A child task may be generated by a TMD 322 executing in the processing cluster array 230. A task is removed from a slot when the task is evicted.

Persons skilled in the art will understand that the architecture described in FIGS. 1, 2, and 3 in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Task Scheduling and Management

The task management unit 300 manages compute tasks to be scheduled as an array of TMD groups that are stored in the scheduler table 321. A TMD group is a set of compute tasks with the same scheduling priority. The number of TMD groups, or priority levels, may be one or more. Within each TMD group, the compute tasks at the respective priority level are stored in a list, which can be implemented with a linked list, and hereinafter a linked list is assumed. Each TMD in a linked list stores a pointer to the next TMD in the respective linked list. A head pointer and a tail pointer for the linked list are stored for each TMD. A TMD group having no tasks has a head pointer that equals the tail pointer and an empty bit is set TRUE.

When compute tasks are received from the host interface 206, the task management unit 300 inserts the compute tasks into a TMD group. More specifically, a task pointer to the TMD corresponding to the compute task is added to the tail of the linked list for that group unless a special TMD bit is set which causes the task to be added to the head of the linked list. Even though all tasks within a TMD group have the same scheduling priority level, the head of the TMD group linked list is the first compute task that is selected by the task management unit 300 and scheduled for execution. Thus, the compute task at the head of the linked list has a relatively higher priority compared with other compute tasks at the same priority level. Similarly, each successive compute task in the linked list at the same priority level as a lower priority relative to preceding compute tasks in the linked list. Therefore, the task management unit 300 is able to schedule the compute tasks within a TMD group in input order relative to one another (assuming none are specially marked to add to the head of the TMD group). Since the TMD group is specified as part of the TMD structure, the TMD group of a compute task cannot be changed while the compute task is being executed. Compute tasks can also be received from the processing cluster array 230.

The collection of compute tasks into groups based on priority levels prior to scheduling the compute tasks allows for a decoupling of the rate at which compute tasks are received by the task management unit 300 from the rate at which compute tasks are output to the work distribution unit 340 for execution. The task management unit 300 is generally able to accept compute tasks from one or more push buffers output by the host interface 206 at a faster rate than the compute tasks may be output for execution by the work distribution unit 340. The input from the different push buffers are independent streams, typically generated by the same application program in order to have multiple sets of dependent tasks, but in some embodiments, multiple application programs can write to the pushbuffers. The task management unit 300 may be configured to buffer the compute tasks in the schedule table 321 and later select one or more compute tasks from the scheduler table 321 for output to the work distribution unit 340. By selecting the compute tasks after they are buffered, the task management unit may make the selection based on more information compared with selecting a compute task as compute tasks are received. For example, the task management unit 300 may buffer several low-priority tasks that are received before a high-priority task. The buffering enables the task management unit 300 to select the high-priority task for output before the low-priority tasks.

The task management unit 300 may perform selection to schedule the compute tasks using several different techniques: round-robin, priority, or partitioned priority scheduling. For each of the different scheduling techniques, when a compute task is selected to be scheduled, the selected compute task is removed from the group in which the selected compute task is stored. Regardless of the scheduling technique, the task management unit 300 is able to quickly select a compute task by selecting the first entry in the linked list of the appropriate group. The task management unit 300 may easily organize, and, if needed, reorder the compute tasks by simply changing the ordering of the task pointers in the linked lists of the TMD groups. Therefore, the compute tasks may be scheduled and/or executed in an order that is different than the order in which the task pointers are received by the task management unit 300 from the host interface 206.

The simplest scheduling scheme is for the task management unit 300 to schedule the compute task at the head of each group (if a compute task exists in the group) and rotate through the groups in round-robin order. Another scheduling technique is priority scheduling that selects the compute tasks in strict priority order. The task management unit 300 selects a compute task from the highest priority group that has at least one compute task, starting at the head of the group.

Figure 4A:
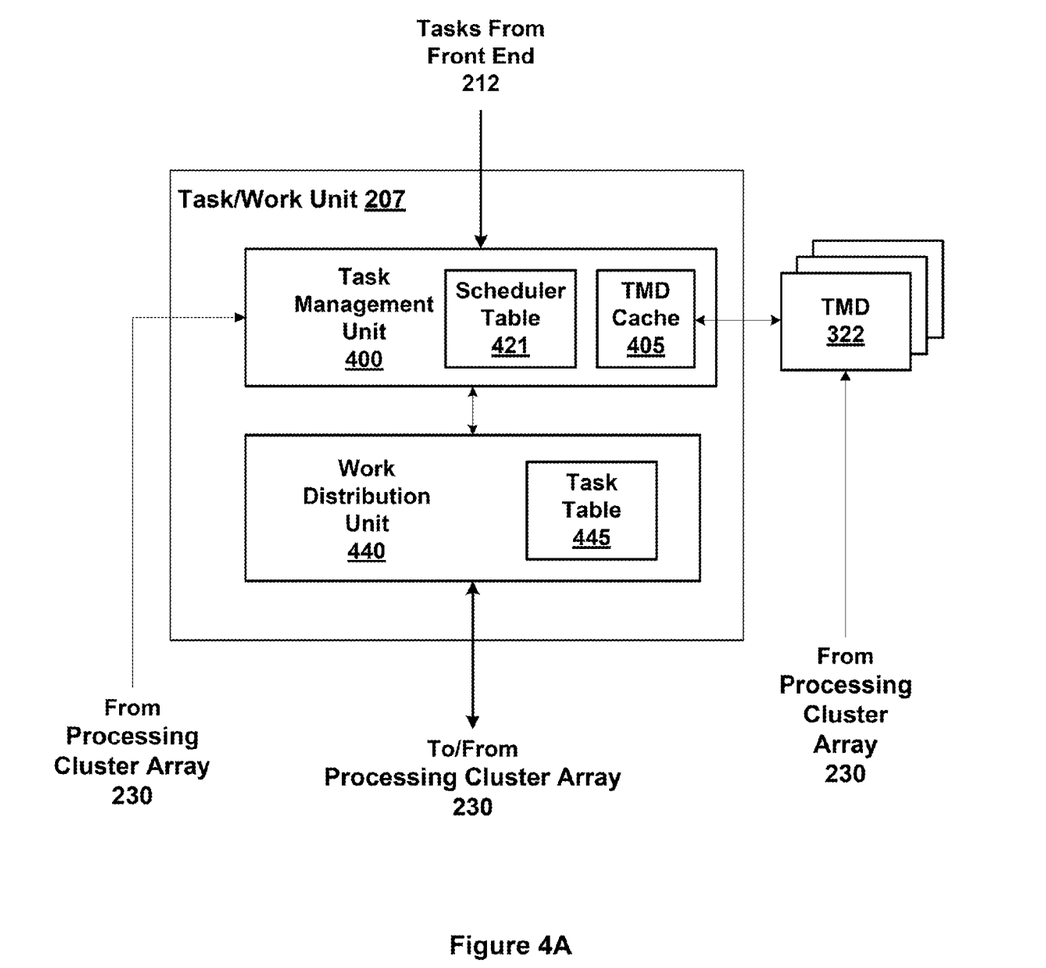
FIG. 4A is another block diagram of the task/work unit of FIG. 3, according to one embodiment of the invention.

FIG. 4A is another block diagram of the task/work unit 207 of FIG. 3, according to one embodiment of the invention. The task/work unit 207 includes a task management unit 400 and a work distribution unit 440 that perform similar functions as the task management unit 300 and the work distribution unit 340. The task management unit 400 includes a scheduler table 421 and a TMD cache 405. The TMD cache 405 stores one or more TMDs 322. The work distribution unit 440 includes a task table 445.

Each TMD 322 may be a large structure, e.g., 256 Bytes or more, that is typically stored in PP memory 204. Due to the large size, the TMDs 322 are expensive to access in terms of bandwidth. Therefore, the TMD cache 405 stores only the (relatively small) portion of the TMD 322 that is needed by the task management unit 600 for scheduling. The remainder of the TMD 322 may be fetched from PP memory 204 when the task is scheduled, i.e., transferred to the work distribution unit 640.

The TMDs 322 are written under software control, and, when a compute task completes execution, the TMD associated with the completed compute task may be recycled to store information for a different compute task. Because a TMD 322 may be stored in the TMD cache 405, the entries storing information for the completed compute task should be flushed from the TMD cache 405. The flushing operation is complicated because the writing of the information for the new compute task is decoupled from a write-back of information stored in the TMD cache 405 to the TMD 322 resulting from the flush. In particular, the information for the new task is written to the TMD 322 and then the TMD 322 is output to the front end 212 as part of a push buffer. Thus, the software does not receive a confirmation that the cache has been flushed, so that writing of the TMD 322 can be delayed. Because the cache write-back may overwrite information stored in the TMD 322 for the new task, a "hardware-only" portion of each TMD 322 is set aside for access only by the task management unit 300 or 400. The remainder of the TMD 322 may be accessed by software and the task management unit 300 or 400. The portion of the TMD 322 that can be accessed by software is typically filled by software to initiate a task. The TMD 322 is then accessed by the task management unit 600 and other processing units in the GPC 208 during scheduling and execution of the task. When information for a new compute task is written to a TMD 322, the command launching the TMD 322 may specify whether to copy bits into the hardware-only portion of the TMD 322 the first time the TMD 322 is loaded into the TMD cache 405. This ensures that the TMD 322 will correctly only store information for the new compute task since any information for the completed compute task would have only been stored in the hardware-only portion of the TMD 322.

Figure 4B:
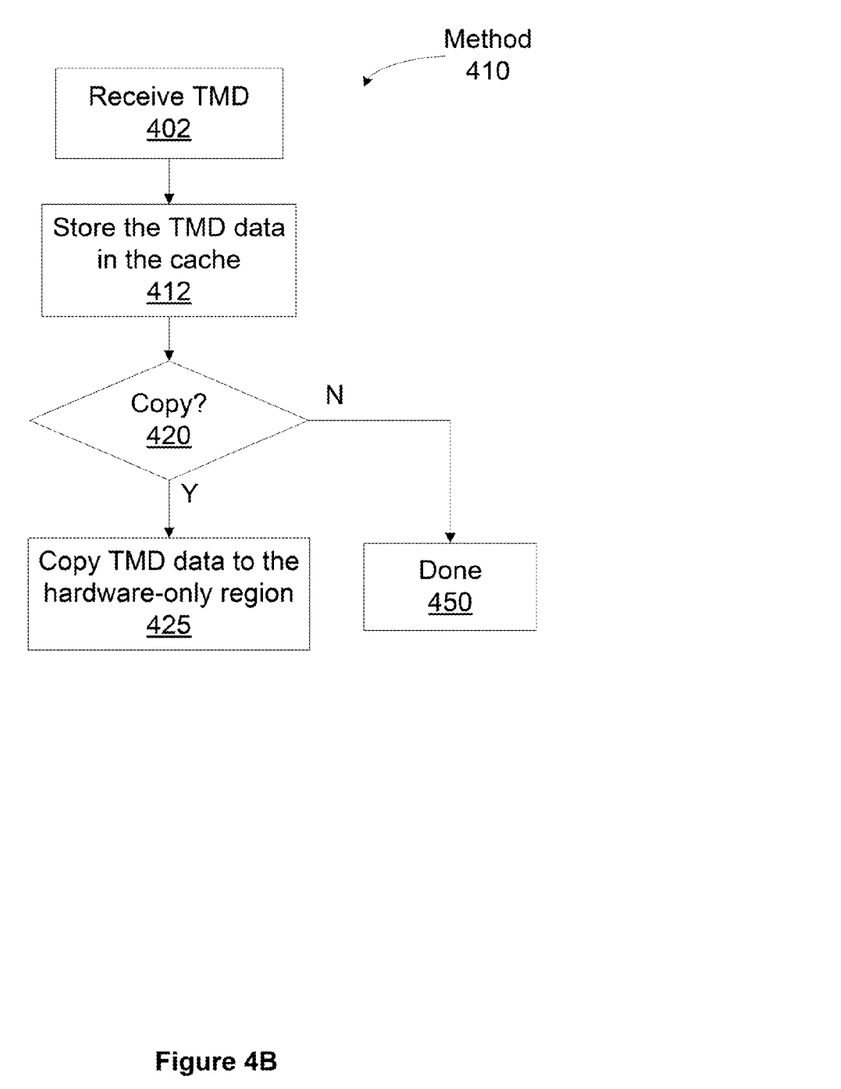
FIG. 4B illustrates a flowchart for a method for loading an entry in the task metadata (TMD) cache of FIG. 4A, according to one embodiment of the invention.

FIG. 4B illustrates a flowchart for a method for loading an entry in the TMD cache 405, according to one embodiment of the invention. Although the method steps are described in conjunction with the systems of FIGS. 1, 2, 3, and 4A, persons skilled in the art will understand that any system configured to perform the method steps, in any order, is within the scope of the inventions.

At step 402 an entry in the TMD cache 405 is identified to be loaded with information stored in a TMD 322. The entry may be identified in response to a cache miss. At step 412 the task management unit 600 stores the TMD information in the cache entry. At step 420 the task management unit 400 determines if the command launching the TMD 322 specifies copying bits into the hardware-only portion of the TMD 322, and, if not, then at step 450 the filling of the entry in the TMD cache 405 is done. Otherwise, at step 425, the task management unit 400 copies the bits from the portion of the TMD 322 that is not hardware-only to the portion of the entry storing the hardware-only portion of the TMD 322. Copying the bits from the portion of the TMD 322 that is not hardware-only to the portion of the entry storing the hardware-only portion of the TMD 322 overwrites data stored for the executed compute task with data for the new compute task.

Compute Task State Encapsulation

Figure 5A:
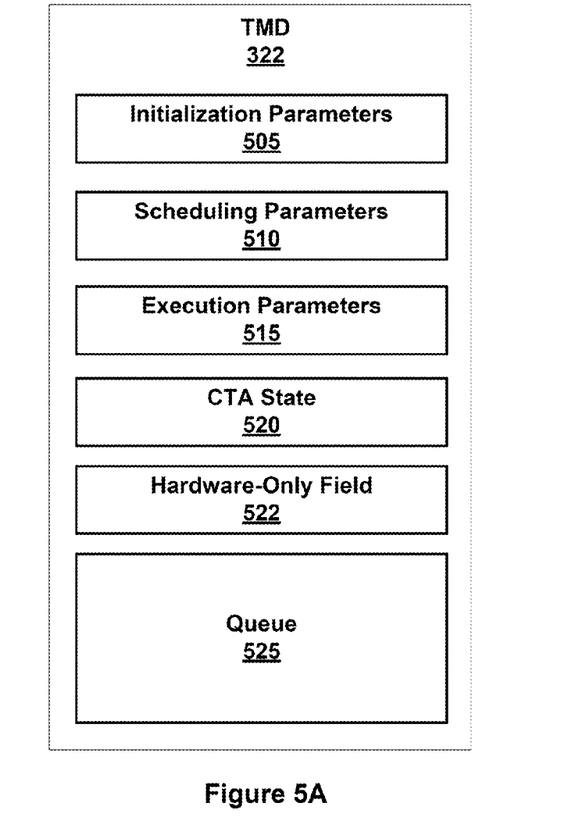
FIG. 5A is a conceptual diagram of the contents of a TMD of FIGS. 3 and 4A, according to one embodiment of the invention.

FIG. 5A is a conceptual diagram of the contents of a TMD 322 that is stored in PP memory 204, according to one embodiment of the invention. The TMD 322 is configured to store initialization parameters 505, scheduling parameters 510, execution parameters 515, CTA state 520, a hardware-only field 422, and a queue 525. The hardware-only field 522 stores the hardware-only portion of the TMD 322, which comprises one or more hardware-only parameters. State that is common to all TMDs 322 is not included in each TMD 322. Because a TMD 322 is a data structure that is stored in PP memory 204, a compute program running on the CPU 102 or PPU 112 can create a TMD 322 structure in memory and then submit the TMD 322 for execution by sending a task pointer to the TMD 322 to the task/work unit 207.

The initialization parameters 505 are used to configure the GPCs 208 when the TMD 322 is launched and may include the starting program address and size of the queue 525. Note that the queue 525 may be stored separately from the TMD 322 in memory in which case the TMD 322 includes a pointer to the queue 525 (queue pointer) in place of the actual queue 525.

The initialization parameters 405 may also include bits to indicate whether various caches, e.g., a texture header cache, a texture sampler cache, a texture data cache, data cache, constant cache, and the like, are invalidated when the TMD 322 is launched. A bit indicating whether texture samplers are linked one-to-one with texture headers may also be included in the initialization parameters 505. Initialization parameters 505 may also include a dimensions of a CTA in threads, a TMD version number, an instruction set version number, dimensions of a grid in terms of CTA width, height, and depth, memory bank mapping parameters, depth of a call stack as seen by an application program, and a size of the call-return stack for the TMD. The initialization parameters 505 may include a size of a constant buffer, an address of the constant buffer, a bit indicating that a constant buffer bind is valid, and a bit indicating that the data from the constant buffer is invalidated in the cache before the TMD is launched may be stored in the initialization parameters 505.

Finally, the initialization parameters 505 may include several parameters related to the amount of memory available for each thread of a CTA. When a TMD 322 needing multiple CTAs that each require large amounts of shared memory are ready to be scheduled for execution, the task/work unit 207 may limit (i.e., throttle) the number of CTAs that execute concurrently so the CTAs do not attempt to consume more memory than is available for access by the TMD 322. Examples of parameters related to the amount of memory available for each thread of a CTA include a size of one or more local memory regions, a number of registers, size of memory that may be directly addressed by the TMD 322 through an L1 cache, an amount of shared memory for a single CTA, and a number of barrier operations for each CTA.

The scheduling parameters 510 control how the task/work unit 207 schedules the TMD 322 for execution. The scheduling parameters 510 may include a bit indicating whether the TMD 322 is a queue TMD or a grid TMD. If the TMD 322 is a grid TMD, then the queue feature of the TMD 322 that allows for additional data to be queued after the TMD 322 is launched is unused, and execution of the TMD 322 causes a fixed number of CTAs to be launched and executed to process the fixed amount of data stored in the queue 525. The number of CTAs is specified as the product of the grid width, height, and depth. The queue 525 is replaced with a queue pointer to the data that will be processed by the CTAs executing the program specified by the TMD 322.

If the TMD 322 is a queue TMD, then the queue feature of the TMD 322 is used, meaning that data are stored in the queue 525, as queue entries. Queue entries are input data to CTAs of the TMD 322. The queue entries may also represent a child tasks that are generated by another TMD 322 during execution of a thread, thereby providing nested parallelism. Typically, execution of the thread, or CTA that includes the thread, is suspended until execution of the child task completes. The queue 525 may be implemented as a circular queue so that the total amount of data is not limited to the size of the queue 525. As previously described, the queue 525 may be stored separately from the TMD 322 and the TMD 322 may store a queue pointer to the queue 525. Advantageously, queue entries for the child task may be written to the queue 525 while the TMD 322 representing the child task is executing.

A variable number of CTAs are executed for a queue TMD, where the number of CTAs depends on the number of entries written to the queue 525 of the TMD queue. The scheduling parameters 510 for a queue TMD also include the number of entries (N) of queue 525 that are processed by each CTA. When N entries are added to the queue 525, one CTA is launched for the TMD 322. The task/work unit 207 may construct a directed graph of processes, where each process is a TMD 322 with a queue. The number of CTAs to be executed for each TMD 322 may be determined based on the value of N for each TMD 322 and the number of entries that have been written in the queue 525.

The scheduling parameters 510 of a queue TMD may also comprise a coalesce waiting time parameter that sets the amount of time that is waited before a CTA is run with less than N queue entries. The coalesce waiting time parameter is needed when the queue is almost empty, but an insufficient number of queue entries is present, which can arise when the total number of queue entries over the course of execution is not evenly divisible by N. The coalesce waiting time parameter is also needed for the case of producer-consumer queues, in order to avoid deadlock. For the case of a CTA being executed with fewer than N entries, the number of queue entries is passed as a parameter to the TMD's program, so that the number of entries can be taken into account during execution.

Alternate embodiments may have different structures for a grid TMD and a queue TMD, or implement only either grid TMDs or queue TMDs. The scheduling parameters 510 of the TMD 322 may include a bit indicating whether scheduling the dependent TMD also causes TMD fields to be copied to the hardware-only field 522. The scheduling parameters 510 may also include the TMD group ID, a bit to indicate where the TMD 322 is added to a linked list (head or tail), and a pointer to the next TMD 322 in the TMD group. The scheduling parameters 510 may also include masks that enable/disable specific streaming multiprocessors within the GPCs 208.

A TMD 322 may include a task pointer to a dependent TMD that is automatically launched when the TMD 322 completes. Semaphores may be executed by the TMDs 322 to ensure that dependencies between the different TMDs 322 and the CPU 102 are met. For example, the execution of a first TMD 322 may depend on a second TMD completing, so the second TMD generates a semaphore release, and the first TMD executes after the corresponding semaphore acquire succeeds. In some embodiments, the semaphore acquire is performed in the host interface 206 or the front end 212. The execution parameters 515 for a TMD 322 may store a plurality of semaphore releases, including the type of memory barrier, address of the semaphore data structure in memory, size of the semaphore data structure, payload, and enable, type, and format of a reduction operation. The data structure of the semaphore may be stored in the execution parameters 515 or may be stored outside of the TMD 322.

The execution parameters 515 may also include the starting address of the program to be executed for the TMD 322, the type of memory barrier operation that is performed when execution of the TMD 322 completes, a serial execution flag indicating whether only a single CTA is executed at a time (serially) for the TMD 322, and a throttle enable flag that controls whether or not the task/work unit 207 may limit the number of CTAs running concurrently based on the memory limitations specified for the TMD 322.

The execution parameters 515 also store various flags that control behaviors of arithmetic operations performed by the processing task that is executed for the TMD 322, e.g., not-a-number (NaN) handling, float-to-integer conversion, and rounding modes of various instructions.

The CTA state 520 for the TMD 322 may include an ID of a reference counter used by the TMD 322, an enable for incrementing the reference counter, and a separate enable for decrementing the reference counter. When a process is preempted, processing of the TMD 322 may be stopped at an instruction boundary or a CTA boundary and identification of the CTA at which processing will be resumed is stored in the CTA state 520. The state information needed to resume execution of the TMD 322 after preemption may be stored in the CTA state 520, or in a separate area in PP memory 204, or in system memory 104.

The CTA state 520 also stores data pointers to entries of the queue 525 and counter overflow flags indicating when each data pointer increments past the end of the queue 525 and needs to wrap back to the start of the queue 525. Hardware-only versions of one or more of the data pointers and the scheduling flag may be stored in the hardware-only field 522.

Figure 5B:
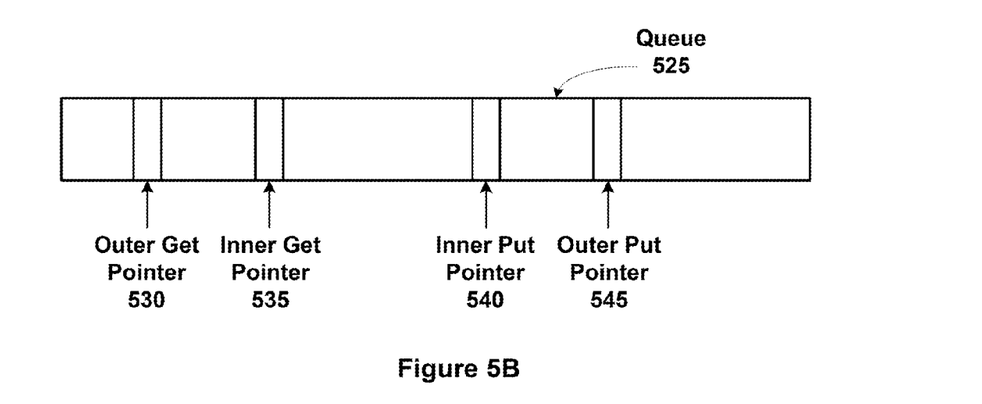
FIG. 5B illustrates pointers to entries of the queue of FIG. 5A, according to one embodiment of the invention.

FIG. 5B illustrates data pointers to entries of the queue 525 of FIG. 5A, according to one embodiment of the invention. Writing data for a processing task encoded in the queue 525 is decoupled from the allocation of entries in the queue 525. First a process reserves or allocates a number of entries in the queue 525 and later, the process stores the data to be processed by the CTAs in the entries. An outer put pointer 545 points to the next available entry in the queue 525 to be allocated and an inner put pointer 540 points to the oldest entry in the queue 525 that has been allocated and not yet written. The entries are not necessarily written in the order in which the entries are allocated, so there may be entries between the inner put pointer 540 and the outer put pointer 545 that have been written.

An outer get pointer 530 points to the oldest entry of the queue 525 that stores data that has been assigned to a CTA for processing, i.e., a CTA that will process the data has been launched but the CTA has not read the data yet. An inner get pointer 535 points to the newest entry of the queue 525 that has been assigned to a CTA for processing. Data that have been written to the queue 525, but not yet assigned to a CTA for processing are stored in the entries between the inner get pointer 535 and the inner put pointer 540. Data that have been assigned to a CTA for processing and not read are stored between the outer get pointer 530 and the inner get pointer 535.

Figure 6:
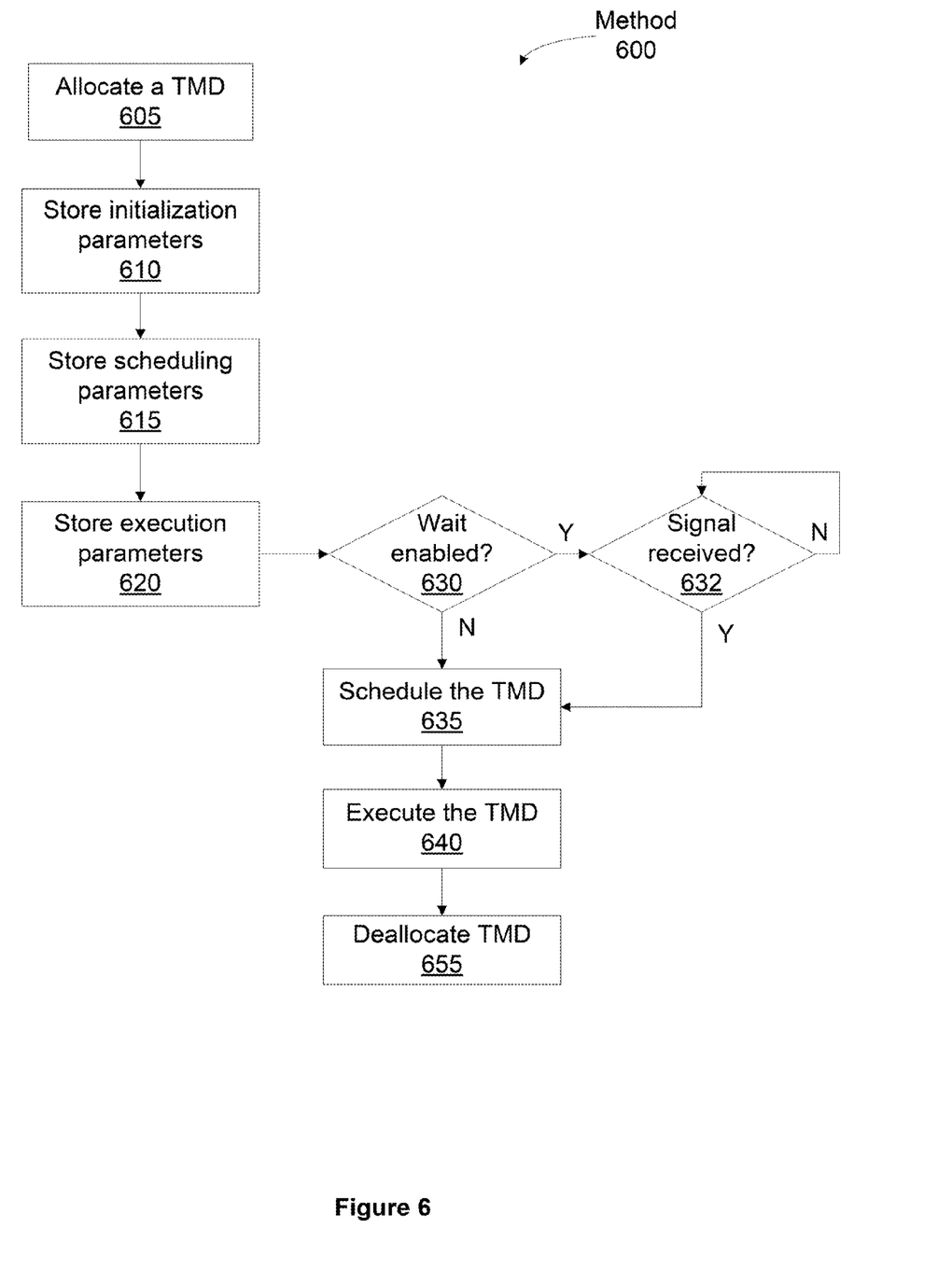
FIG. 6 illustrates a method for encapsulating compute task state in a grid TMD of FIGS. 3, 4A, and 5, according to one embodiment of the invention.

FIG. 6 illustrates a method for encapsulating compute task state in a TMD 322 of FIGS. 3, 4A, and 5A, for a grid TMD, according to one embodiment of the invention. Although the method steps are described in conjunction with the systems of FIGS. 1, 2, 3, and 4A, persons skilled in the art will understand that any system configured to perform the method steps, in any order, is within the scope of the inventions.

At step 605 a TMD 322 is allocated, i.e., memory in which to store the TMD 322 data is allocated. At step 610 the initialization parameters 505 are stored in the TMD 322. At step 615 the scheduling parameters 510 are stored in the TMD 322. At step 620 the execution parameters 515 are stored in the TMD 322. At step 630, if the TMD 322 is not waiting for an event to occur (e.g., a semaphore release) before execution can proceed, then the task/work unit 207 proceeds directly to step 635 and schedules the TMD 322. Otherwise, if at step 630 the TMD 322 is waiting for an event to occur, then at step 632, the TMD 322 determines if a signal is received indicating that execution of the TMD 322 may continue. When the event occurs, the method proceeds to step 635.

At step 635, the task/work unit 207 schedules the TMD 322 and the GPCs 208 and memory that is available for use by the TMD 322 are configured based on the initialization parameters 505. The TMD 322 is scheduled by the task/work unit 207 based on the scheduling parameters 510. At step 640, one or more CTAs are launched to execute the TMD 322 on the GPCs 208. During execution of the CTAs, the processing tasks are performed based on the execution parameters 515. At step 655 when the one or more CTAs complete execution and exit and the TMD 322 is deallocated.

Figure 7:
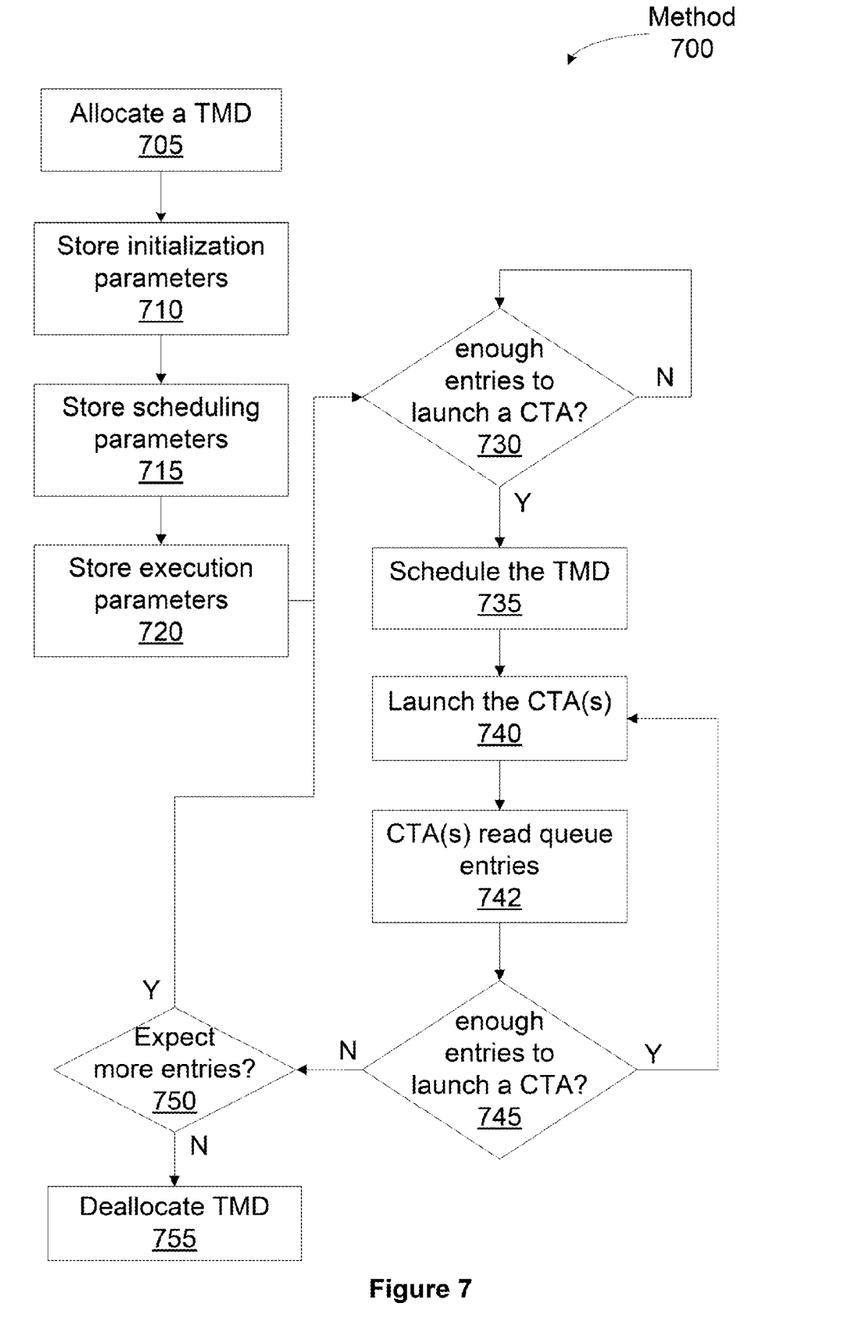
FIG. 7 illustrates a method for encapsulating compute task state in a queue TMD of FIGS. 3, 4A, and 5, according to one embodiment of the invention.

FIG. 7 illustrates a method for encapsulating compute task state in a TMD 322 of FIGS. 3, 4A, and 5A, for a queue TMD, according to one embodiment of the invention. Although the method steps are described in conjunction with the systems of FIGS. 1, 2, 3, and 4A, persons skilled in the art will understand that any system configured to perform the method steps, in any order, is within the scope of the inventions.

At step 705 a TMD 322 is allocated, i.e., memory in which to store the TMD 322 data is allocated. At step 710 the initialization parameters 505 are stored in the TMD 322. At step 715 the scheduling parameters 510 are stored in the TMD 322. At step 720 the execution parameters 515 are stored in the TMD 322. Entries may be written to the queue 525 after the TMD 322 is allocated and additional entries may be written to the queue 525 as CTAs are executed for the TMD 322. When the queue 525 is a circular queue, entries that have been read by a CTA may be overwritten with additional queue entries by another TMD 322 or by the CPU 102 via the front end 212. Writing of the queue 525 is decoupled from reading of the queue 525 by the CTAs, and may occur simultaneously with the reading.

At step 730, the task/work unit 207 determines whether enough entries in queue 525 have been written to launch a CTA, and, if not, the task/work unit 207 waits for more entries to be written to the queue 525. At step 730, if enough entries in queue 525 have been written, the task/work unit 207 schedules the TMD 322 at step 735. The task/work unit 207 configures GPCs 208 and memory that is available for use by the TMD 322 based on the initialization parameters 505. The TMD 322 is scheduled by the task/work unit 207 based on the scheduling parameters 510.

At step 740, based on the number of entries written in the queue 525, one or more CTAs are launched to execute the TMD 322 on the GPCs 208. At step 742 the launched CTAs each read a number of entries (N) written in the queue 525 such that the total number of entries read equals N* number of CTAs launched. During execution of the CTAs, the processing tasks are performed based on the execution parameters 515 and each CTA processes data written in N entries of the queue 525. At step 745, the task/work unit 207 determines whether enough entries in queue 525 have been written to launch a CTA, and, if not, the task/work unit 207 proceeds to step 750. Otherwise, the task/work unit 207 returns directly to step 740 to launch one or more CTAs. Therefore, when CTAs for a TMD are writing entries to the queue 525, additional CTAs may be launched without scheduling the TMD 322 again, since the TMD 322 is currently scheduled.

If, at step 750, the task/work unit 207 determines that no more entries will be written in the queue 525 and no more entries in the queue 525 can be written, the TMD 322 is deallocated at step 755. If there are more entries in the queue 525 that are written or more entries that can be written in the queue 525, then the task/work unit 207 returns to step 730.

The encapsulation mechanism of encoding compute processing tasks into TMDs 322 allows for each TMD 322 to store initialization, scheduling, and execution parameters that are specific to the particular TMD 322. The initialization and execution scheduling parameters are used to configure streaming multiprocessors and memory resources for execution of the TMD 322. The scheduling parameters are used to control the scheduling of the TMDs 322 for execution, including out-of-order execution.

One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:

1. A method for encapsulating and scheduling compute tasks in a streaming multiprocessor, the method comprising:
   allocating a first portion of memory for storing a plurality of metadata structures for a plurality of compute tasks, wherein a plurality of pointers to the plurality of metadata structures is stored in a linked list of pointers indicating an execution order associated with the plurality of compute tasks, wherein each metadata structure included in the plurality of metadata structures corresponds to a different compute task included in the plurality of compute tasks, and each pointer included in the plurality of pointers points to a different metadata structure included in the plurality of metadata structures, and wherein the linked list of pointers is stored in a second portion of memory that is separate from the first portion of memory;
   storing initialization parameters in a first metadata structure included in the plurality of metadata structures that configure the streaming multiprocessor to execute a first compute task included in the plurality of compute tasks;
   storing scheduling parameters in the first metadata structure that control the scheduling of the first compute task;

storing execution parameters in the first metadata structure that control execution of the first compute task by the streaming multiprocessor;

storing a first pointer and a counter overflow flag that is separate from the first pointer in the first metadata structure, wherein the first pointer points to a queue that stores input data associated with the first compute task and the counter overflow flag indicates when a data pointer pointing to an entry in the queue is to wrap to a beginning of the queue; and scheduling, based on the linked list of pointers and the scheduling parameters in the first metadata structure, the first compute task for execution in the streaming multiprocessor, wherein the first compute task executes in the streaming multiprocessor based on the execution parameters in the first metadata structure.

2. A method for encapsulating and scheduling compute tasks in a streaming multiprocessor, the method comprising:

allocating a first portion of memory for storing a plurality of metadata structures for a plurality of compute tasks, wherein a plurality of pointers to the plurality of metadata structures is stored in a linked list of pointers indicating an execution order associated with the plurality of compute tasks, wherein each metadata structure included in the plurality of metadata structures corresponds to a different compute task included in the plurality of compute tasks, and each pointer included in the plurality of pointers points to a different metadata structure included in the plurality of metadata structures, and wherein the linked list of pointers is stored in a second portion of memory that is separate from the first portion of memory;

storing initialization parameters in a first metadata structure included in the plurality of metadata structures that configure the streaming multiprocessor to execute a first compute task included in the plurality of compute tasks;

storing execution parameters in the first metadata structure that control execution of the first compute task by the streaming multiprocessor;

storing a first pointer in the first metadata structure, wherein the first pointer points to a queue that stores input data associated with the first compute task;

storing scheduling parameters in the first metadata structure that control the scheduling of the first compute task, wherein the scheduling parameters include a launch parameter that indicates a minimum number of entries needed in the queue for the first compute task to be launched and a coalesce waiting time parameter that indicates a length of time after which the compute task is to be launched even when the queue has fewer than the minimum number of entries; and scheduling, based on the linked list of pointers and the scheduling parameters in the first metadata structure, the first compute task for execution in the streaming multiprocessor, wherein the first compute task executes in the streaming multiprocessor based on the execution parameters in the first metadata structure.

3. The method of claim 1, further comprising:

accessing, via the data pointer, the input data associated with the first compute task;

executing the first compute task based on the input data associated with the first compute task;

determining that the counter overflow flag is not set; and incrementing the data pointer to point to data in the queue other than the input data associated with the first compute task.

4. The method of claim 1, further comprising:

accessing, via the data pointer, the input data associated with the first compute task;

executing the first compute task based on the input data associated with the first compute task;

determining that the counter overflow flag is set; and wrapping the data pointer to the beginning of the queue.

5. The method of claim 1, wherein the scheduling parameters include a launch parameter that indicates a minimum number of entries needed in the queue for the first compute task to be launched, and wherein scheduling, based on the linked list of pointers and the scheduling parameters in the first metadata structure, the first compute task for execution comprises:

determining that a first number of entries in the queue is greater than or equal to a value of the launch parameter; and scheduling the first compute task for execution.

6. The method of claim 1, wherein the scheduling parameters include a launch parameter that indicates a minimum number of entries needed in the queue for the first compute task to be launched and a coalesce waiting time parameter that indicates a length of time after which the first compute task is to be launched even when the queue has fewer than the minimum number of entries, and wherein scheduling, based on the linked list of pointers and the scheduling parameters in the first metadata structure, the first compute task for execution comprises:

determining that the length of time indicated by a value of the coalesce waiting time parameter has passed; and scheduling the first compute task for execution.

7. The method of claim 1, wherein the scheduling parameters include a launch parameter that indicates a minimum number of entries needed in the queue for the first compute task to be launched and a coalesce waiting time parameter that indicates a length of time after which the first compute task is to be launched even when the queue has fewer than the minimum number of entries, and wherein scheduling, based on the linked list of pointers and the scheduling parameters in the first metadata structure, the first compute task for execution comprises:

determining that a first number of entries in the queue is less than a value of the launch parameter;

determining that the length of time indicated by a value of the coalesce waiting time parameter has not passed; and delaying scheduling of the first compute task.

8. The method of claim 1, wherein the execution parameters include a plurality of semaphore releases that includes at least one of a type of memory barrier, an address of a semaphore data structure in memory, or a size of the semaphore data structure.

9. The method of claim 1, wherein the execution parameters include a starting address of the first compute task to be executed or a type of memory barrier operation that is performed when execution of the first compute task completes.

10. The method of claim 1, wherein the execution parameters include a serial execution flag that indicates whether a first set of threads associated with the first compute task is permitted to execute concurrently with a second set of threads associated with the first compute task.

11. The method of claim 1, wherein the execution parameters include a throttle enable flag that controls whether a number of sets of threads executing concurrently is permitted based on memory limitations specified by parameters stored in the first metadata structure.

12. The method of claim 2, wherein a total number of entries in the queue over a course of execution is not evenly divisible by a minimum number of entries in the queue, and, in response, a first number of entries in the queue is less than a value of the launch parameter.

13. The method of claim 2, further comprising transmitting, to the first compute task, a first number of entries in the queue as a parameter.

14. The method of claim 2, wherein scheduling, based on the linked list of pointers and the scheduling parameters in the first metadata structure, the first compute task for execution comprises:
 determining that a first number of entries in the queue is greater than or equal to a value of the launch parameter; and
 scheduling the first compute task for execution.

15. The method of claim 2, wherein scheduling, based on the linked list of pointers and the scheduling parameters in the first metadata structure, the first compute task for execution comprises:
 determining that the length of time indicated by a value of the coalesce waiting time parameter has passed; and
 scheduling the first compute task for execution.

16. The method of claim 2, wherein scheduling, based on the linked list of pointers and the scheduling parameters in the first metadata structure, the first compute task for execution comprises:
 determining that a first number of entries in the queue is less than a value of the launch parameter;
 determining that the length of time indicated by a value of the coalesce waiting time parameter has not passed; and
 delaying scheduling of the first compute task.

17. The method of claim 2, wherein the execution parameters include a plurality of semaphore releases that includes at least one of a type of memory barrier, an address of a semaphore data structure in memory, or a size of the semaphore data structure.

18. The method of claim 2, wherein the execution parameters include a starting address of the first compute task to be executed or a type of memory barrier operation that is performed when execution of the first compute task completes.

19. The method of claim 2, wherein the execution parameters include a serial execution flag that indicates whether a first set of threads associated with the first compute task is permitted to execute concurrently with a second set of threads associated with the first compute task.

20. The method of claim 2, wherein the execution parameters include a throttle enable flag that controls whether a number of sets of threads executing concurrently is permitted based on memory limitations specified by parameters stored in the first metadata structure.

21. The method of claim 1, wherein the linked list of pointers is stored in a scheduler table, and the plurality of metadata structures are stored in a first memory separate from the scheduler table, and the method further comprises altering the execution order associated with the plurality of compute tasks by causing at least one pointer included at a first position within the linked list of pointers to reference a different metadata structure corresponding to a different compute task.

22. The method of claim 1, wherein the plurality of compute tasks is organized into one or more groups of compute tasks based on one or more priority levels associated with the plurality of compute tasks, and wherein the execution order indicated by the linked list of pointers indicates an execution order of the one or more groups of compute tasks based on the one or more priority levels.

* * * * *